(12) United States Patent
Okada et al.

(10) Patent No.: US 12,346,401 B2  
(45) Date of Patent: Jul. 1, 2025

(54) COMBINATORIAL OPTIMIZATION SYSTEM AND COMBINATORIAL OPTIMIZATION METHOD

(71) Applicants: DENSO CORPORATION, Kariya (JP); TOHOKU UNIVERSITY, Sendai (JP)

(72) Inventors: Shuntaro Okada, Kariya (JP); Masayuki Ohzeki, Sendai (JP)

(73) Assignees: DENSO CORPORATION, Kariya (JP); TOHOKU UNIVERSITY, Sendai (JP)

( * ) Notice: Subject to any disclaimer, the term of this patent is extended or adjusted under 35 U.S.C. 154(b) by 946 days.

(21) Appl. No.: 17/483,632

(22) Filed: Sep. 23, 2021

(65) Prior Publication Data

US 2022/0012301 A1  Jan. 13, 2022

Related U.S. Application Data

(63) Continuation-in-part of application No. PCT/JP2020/007652, filed on Feb. 26, 2020.

(30) Foreign Application Priority Data

Mar. 26, 2019 (JP) .................. 2019-058191

(51) Int. Cl.  
*G06F 17/11* (2006.01)  
*G06F 7/46* (2006.01)

(52) U.S. Cl.  
CPC .............. *G06F 17/11* (2013.01); *G06F 7/468* (2013.01)

(58) Field of Classification Search  
CPC .................. G06F 17/11; G06F 7/468

USPC .......................................................... 703/2  
See application file for complete search history.

(56) References Cited

U.S. PATENT DOCUMENTS

| | | | | |
|---|---|---|---|---|
| 10,325,218 B1* | 6/2019 | Zeng | ...................... | G06N 10/60 |
| 11,244,026 B2* | 2/2022 | Kondou | ................... | G06N 5/01 |
| 2007/0208677 A1* | 9/2007 | Goldberg | ............... | G06N 3/126 |
| | | | | 706/13 |
| 2015/0193692 A1* | 7/2015 | Israel | ...................... | G06F 17/11 |
| | | | | 706/52 |
| 2015/0278408 A1* | 10/2015 | Yoshimura | ............... | G06N 7/01 |
| 2016/0063391 A1* | 3/2016 | Hayashi | ................... | G06N 7/01 |
| | | | | 706/11 |
| 2016/0224515 A1* | 8/2016 | Ronagh | .................... | G06N 5/01 |
| 2017/0161612 A1* | 6/2017 | Hastings | ................ | G06N 5/022 |

(Continued)

FOREIGN PATENT DOCUMENTS

JP     2020160685 A * 10/2020  .............. G06F 17/11

OTHER PUBLICATIONS

Neukart et al. (Traffic flow optimization using a quantum annealer, arXiv, 2017, pp. 1-12) (Year: 2017).*

(Continued)

*Primary Examiner* — Iftekhar A Khan  
(74) *Attorney, Agent, or Firm* — Maschoff Brennan

(57) ABSTRACT

A combinatorial optimization system includes an input unit to which a multivalued optimization problem is input, a halving unit configured to perform halving to select half of candidate solutions of the multivalued optimization problem, and an optimization control unit configured to obtain an optimal solution of the multivalued optimization problem by causing the halving unit to repeat the halving.

8 Claims, 5 Drawing Sheets

(56) References Cited

U.S. PATENT DOCUMENTS

| | | | | |
|---|---|---|---|---|
| 2017/0242824 A1* | 8/2017 | Karimi | | G06F 17/11 |
| 2019/0102917 A1* | 4/2019 | Bishop | | G06T 1/20 |
| 2019/0235033 A1* | 8/2019 | Ohzeki | | H03K 19/195 |
| 2019/0391807 A1* | 12/2019 | Inagaki | | G06F 17/11 |
| 2020/0089728 A1* | 3/2020 | Kondou | | G06N 5/01 |
| 2020/0286595 A1* | 9/2020 | Neukart | | G16C 20/90 |
| 2020/0302306 A1* | 9/2020 | Matsuo | | G06N 10/60 |
| 2020/0380065 A1* | 12/2020 | Tomita | | G06F 30/20 |
| 2020/0410372 A1* | 12/2020 | Miyazawa | | G06F 17/11 |
| 2021/0248507 A1* | 8/2021 | Jippo | | G06F 7/38 |
| 2021/0303704 A1* | 9/2021 | Chen | | G06N 5/01 |
| 2022/0012301 A1* | 1/2022 | Okada | | G06N 10/60 |

OTHER PUBLICATIONS

Andrew Lucas (Ising formulations of many NP problems, arXiv, 2014, pp. 1-27). (Year: 2014).*

Kadowaki et al. (Quantum annealing in the transverse Ising model, 1998, IEEE, pp. 5355-5363) (Year: 1998).*

Khanh et al. (Optimization of thermo-electric coolers using hybrid genetic algorithm and simulated annealing, Archives of Control Sciences, 2014, pp. 155-176) (Year: 2014).*

Ohzeki et al. (Control of automated guided vehicles without collision by quantum annealer and digital devices, arXiv, 2018, pp. 1-12) (Year: 2018).*

Lucas, "Ising formulations of many NP problems", Dept. of Physics, Harvard University, Cambridge, MA, USA, 02138, https://arxiv.org/pdf/1302.5843, Jan. 24, 2014, 27 pgs.

Neukart et al., "Traffic flow optimization using a quantum annealer", https://arxiv.org/pdf/1708.01625, Aug. 9, 2017, 12 pgs.

Ohzeki et al., "Control of automated guided vehicles without collision by quantum annealer and digital device", https://arxiv.org/pdf/1812.01532v1, Dec. 4, 2018, 12 pgs.

\* cited by examiner

COMBINATORIAL OPTIMIZATION SYSTEM AND COMBINATORIAL OPTIMIZATION METHOD

CROSS REFERENCE TO RELATED APPLICATION

The present application is a continuation-in-part application of International Patent Application No. PCT/JP2020/007652 filed on Feb. 26, 2020, which designated the U.S. and claims the benefit of priority from Japanese Patent Application No. 2019-058191 filed on Mar. 26, 2019. The entire disclosures of all of the above applications are incorporated herein by reference.

TECHNICAL FIELD

The present disclosure relates to a combinatorial optimization system and a combinatorial optimization method for optimizing a combinatorial optimization problem (hereinafter, simply referred to as "optimization problem").

BACKGROUND

Hardware specialized for combinatorial optimization problems (hereinafter referred to as "dedicated machine") include a quantum annealing machine of D-Wave (registered trademark), Fujitsu's digital annealer (registered trademark), and Hitachi's CMOS annealing machine. These dedicated machines can perform the optimization of evaluation functions defined by binary variables faster than ordinary computers. However, in actual situations, it is often required to optimize the evaluation functions defined by multivalued variables, i.e., solve optimization problems with multivalued variables (hereinafter referred to as "multivalued optimization problems"). A generally used method for solving multivalued optimization problems with a dedicated machine that can only handle binary variables is to use one-hot encoding to represent the multivalued optimization problem in binary form, and then perform optimization using the dedicated machine.

The one-hot encoding assigns as many binary variables as the number of states that each of the multivalued variables in the multivalued optimization problem can take. FIG. 7 shows the binary representation of the problem of minimizing the energy of the one-dimensional Potts model shown in Equation (1) below, using the one-hot constraint.

$$\mathcal{H}_0 = -\sum_{i=1}^{N-1} J_i \delta(S_i, S_{i+1})$$ (Equation 1)

$$S_i \in (1, 2, \ldots, Q)$$

The evaluation function in this case is shown in the following Equation (2).

$$H_0 = -\sum_{i=1}^{N-1} J_i \sum_{q=1}^{Q} x_i^{(q)} x_{i+1}^{(q)} + \lambda \sum_{i=1}^{N} \left( \sum_{q=1}^{Q} x_i^{(q)} - 1 \right)^2$$ (Equation 2)

$$x_i^{(q)} \in (0, 1)$$

Here, Si in the Equation (1) can take Q different states, and the Equation (1) is an optimization problem to select one state out of Q states for each multivalued variable so that the Hamiltonian HO is the smallest. In the evaluation function of Equation (2), xi(q)=1 indicates that the component q is selected for the multivalued valuable Si. The first term on the right side represents the contribution of a condition where adjacent multivalued valuables are the same. The second term on the right side is a penalty term (one-hot constraint) for lowering the evaluation value when the state of each multivalued valuable is selected once.

As shown in FIG. 7, there are NQ binary variables in the one-hot encoding, and the one-hot constraint restricts only one "1" to be represented among the binary variables in the vertical direction.

The generalization of the Equation (2) is shown in the Equation (3) below.

$$H_0 = -\sum_{i=1}^{N} \sum_{q \le q'}^{Q} J_{ii}^{(qq')} x_i^{(q)} x_i^{(q')} - \sum_{i<j}^{N} \sum_{q,q'=1}^{Q} J_{ij}^{(qq')} x_i^{(q)} x_j^{(q')} + \lambda \sum_{i=1}^{N} \left( \sum_{q=1}^{Q} x_i^{(q)} - 1 \right)^2$$ (Equation 3)

Here, the first and second terms on the right side of Equation (3) are the parts that express the problem to be solved, and the third term on the right side is the constraint.

SUMMARY

A combinatorial optimization system according to a first aspect of the present disclosure includes an input unit to which a multivalued optimization problem is input, a halving unit configured to perform halving to select half of candidate solutions of the multivalued optimization problem, and an optimization control unit configured to obtain an optimal solution of the multivalued optimization problem by causing the halving unit to repeat the halving.

A method of solving a multivalued optimization problem according to a second aspect of the present disclosure includes inputting the multivalued optimization problem, halving candidate solutions of the multivalued optimization problem by selecting half of the candidate solutions of the multivalued optimization problem, and repeating the halving to obtain an optimal solution of the multivalued optimization problem.

A combinatorial optimization system according to a third aspect of the present disclosure is configured to solve a multivalued optimization problem and includes at least one processor. The at least one processor is configured to halve candidate solutions of the multivalued optimization problem by selecting half of the candidate solutions, and obtain an optimal solution of the multivalued optimization problem by halving the candidate solutions repeatedly.

EMBODIMENTS

Many multivalued optimization problems are inherently more difficult to solve than binary optimization problems, and it may be difficult to solve multivalued optimization problems with high accuracy by simply combining one-hot constraints and dedicated machines.

Hereinafter, embodiments of the present disclosure will be described with reference to the drawings. The embodiments described below show an example in the case of practicing the present disclosure, and the present disclosure is not limited to the specific configuration described below. In the implementation of the present disclosure, a specific configuration according to the embodiments may be adopted as appropriate.

First Embodiment

Figure 1:
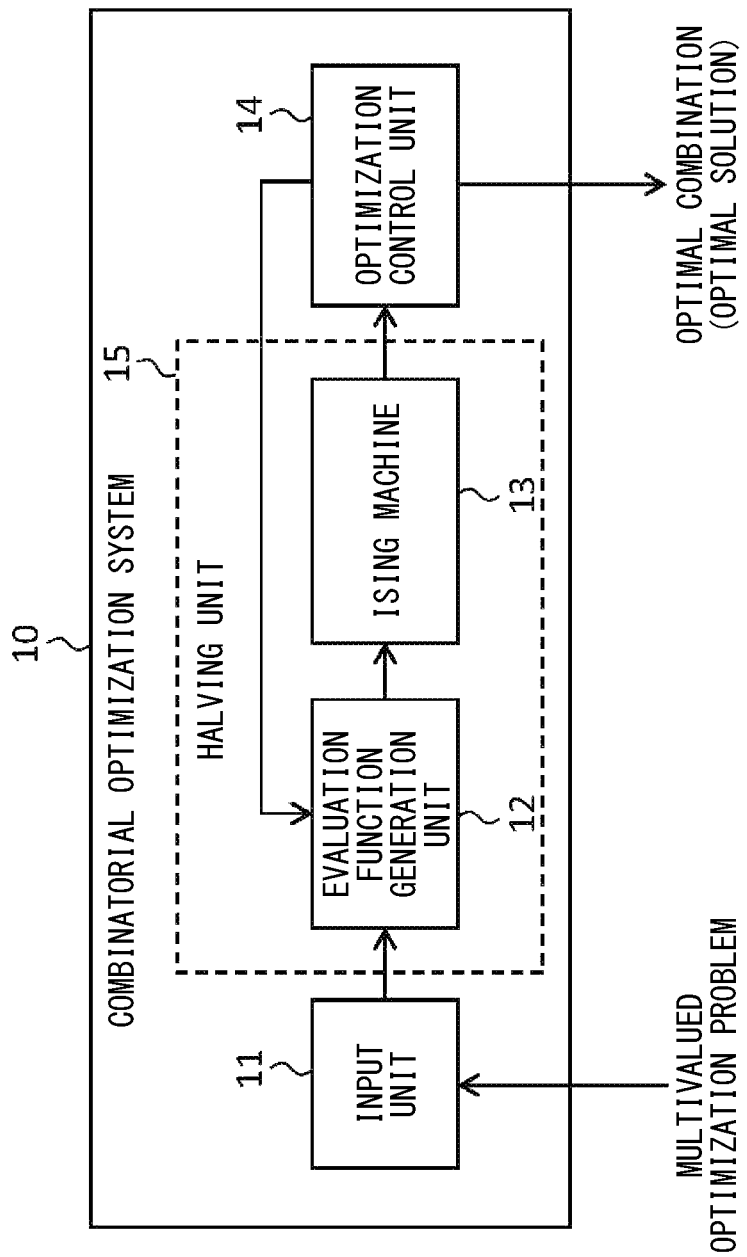
FIG. 1 is a block diagram showing a configuration of a combinatorial optimization system according to a first embodiment of the present disclosure.

FIG. 1 is a block diagram showing a configuration of a combinatorial optimization system 10 according to a first embodiment of the present disclosure. The combinatorial optimization system 10 includes an input unit 11, an evaluation function generation unit 12, an Ising machine 13, and an optimization control unit 14. In the present embodiment, the configuration including the evaluation function generation unit 12 and the Ising machine 13 is referred to as a halving unit 15.

The combinatorial optimization system 10 includes at least one memory and at least one processor. The memory is a non-transitional tangible storage medium such as a semiconductor memory, a magnetic medium, and an optical medium that temporarily stores a computer readable program, data, and the like. The processor includes, as a core, at least one of a CPU (Central Processing Unit), a GPU (Graphics Processing Unit), RISC-CPU (Reduced Instruction Set Computer CPU), DFP (Data Flow Processor), GSP (Graph Streaming Processor), and the like.

The processor of the combinatorial optimization system 10 is configured to execute instructions contained in the program stored in the memory. Accordingly, the combinatorial optimization system 10 includes, as functional units, the input unit 11, the evaluation function generation unit 12, the optimization control unit 14, and the like.

A multivalued optimization problem is input to the input unit 11. Specifically, a $\{Jij(qq')\}$ matrix is input to the input unit 11 as the multivalued optimization problem, for example.

The evaluation function generator 12 is configured to generate an evaluation function for the $\{Jij(qq')\}$ matrix, which is a multivalued optimization problem input to the input unit 11, in a binary representation using half-hot constraints. As described above, the evaluation function of the Potts model that imposes the one-hot constraint is the Equation (2). In contrast, the evaluation function generator 12 is configured to generate the evaluation function of the Equation (4) below as the evaluation function of the Potts model that imposes the half-hot constraint. Shuntaro Okada, Masayuki Ohzeki, and Kazuyuki Tanaka, "Efficient Quantum and Simulated Annealing of Potts Models Using a Half-hot Constraint" discloses the half-hot constraint, which is incorporated herein by reference.

$$H_0 = -\sum_{i<j}^{N} J_{ij} \sum_{q=1}^{Q} x_i^{(q)} x_j^{(q)} + \lambda \sum_{i=1}^{N} \left( \sum_{q=1}^{Q} x_i^{(q)} - \frac{Q}{2} \right)^2 \quad \text{(Equation 4)}$$

The second term of the right side of this Equation (4) corresponds to the half-hot constraint.

The Ising machine 13 is a dedicated machine (e.g. a computer) configured to perform annealing using the evaluation function generated by the evaluation function generation unit 12. The annealing here may be simulated annealing, quantum annealing, or the like. As described above, since the evaluation function generator 12 generates the evaluation function with a binary representation using the half-hot constraint, half the states (candidates) of the multivalued optimization problem are selected by optimizing the evaluation function by the Ising machine 13 (i.e. by performing Ising machine process to minimize the evaluation function).

The optimization control unit 14 is configured to eventually obtain one optimal solution by repeating the above described processes performed by the evaluation function generation unit 12 and the Ising machine 13. The optimization control unit 14 is configured to return the half candidates selected by the Ising machine 13 to the evaluation function generation unit 12 such that the evaluation function generation unit 12 generates an evaluation function again. The Ising machine 13 performs the optimization using the newly generated evaluation function when new evaluation function is generated by the evaluation function generation unit 12. As a result, further half the states are selected.

The optimization control unit 14 is configured to repeat the above processes until one state is selected by the Ising machine 13. When one optimal combination of variables (optimal solution) is obtained by the Ising machine 13, the optimization control unit 14 outputs this optimal solution.

As described above, in the combinatorial optimization system 10 of the present embodiment, the evaluation function generation unit 12 is configured to generate the evaluation function with a binary representation using half-hot constraints as the evaluation function for the multivalued optimization problem, the Ising machine 13 is configured to select half the states using the evaluation function, and the optimization control unit 14 is configured to control the evaluation function generation unit 12 to generate the evaluation function again. By repeating these processes to eventually obtain the optimal combination, the computational cost (amount of computation and/or computation time) can be significantly reduced.

The way in which the combinatorial optimization system 10 of the present embodiment reduces the computational cost will be explained using an example of the processing time for solving the multivalued optimization problem, i.e., minimizing the energy of the ferromagnetic model that is the Potts model. When the multivalued optimization problem $J_{ij}$ satisfies $J_{ij}=J>0$, this ferromagnetic model is the fully connected ferromagnetic Potts model, and the energy represented by the Equation (2) is the minimum in a condition where all the multivalued valuables are the same.

This ferromagnetic model has an obvious optimal solution. However, when it is optimized using simulated annealing or quantum annealing, a first-order phase transition occurs in the middle, and the time required to obtain the optimal solution increases exponentially with the number N of multi-valued variables for Q≥3. In contrast, according to the combinatorial optimization system 10 of the present embodiment, only a second-order phase transition occurs, and the processing time for each optimization process increases polynomially with respect to N, so the overall processing time can be reduced.

Here, the generalization of the Equations (2) and (3) gives the following Equations (5) and (6).

$$H_0 = -\sum_{i<j}^{N} J_{ij}\delta(S_i, S_j) \quad \text{(Equation 5)}$$

$$s_i \in (1, 2, \ldots, Q)$$

$$H_0 = -\sum_{i<j} J_{ij} \sum_{\alpha=1}^{Q/2} \sum_{\beta=1}^{Q/2} \delta(S_i^{(\alpha)}, S_j^{(\beta)}) \quad \text{(Equation 6)}$$

$$S_i^{(\alpha)} \in (1, 2, \ldots, Q)$$

$$S_i^{(\alpha)} \neq S_i^{(\alpha'\neq\alpha)}$$

According to the combinatorial optimization system 10 of the present embodiment, the evaluation function represented by the Equation (6) is generated by the evaluation function generation unit 12 instead of the general evaluation function represented by the Equation (5).

Figure 2:
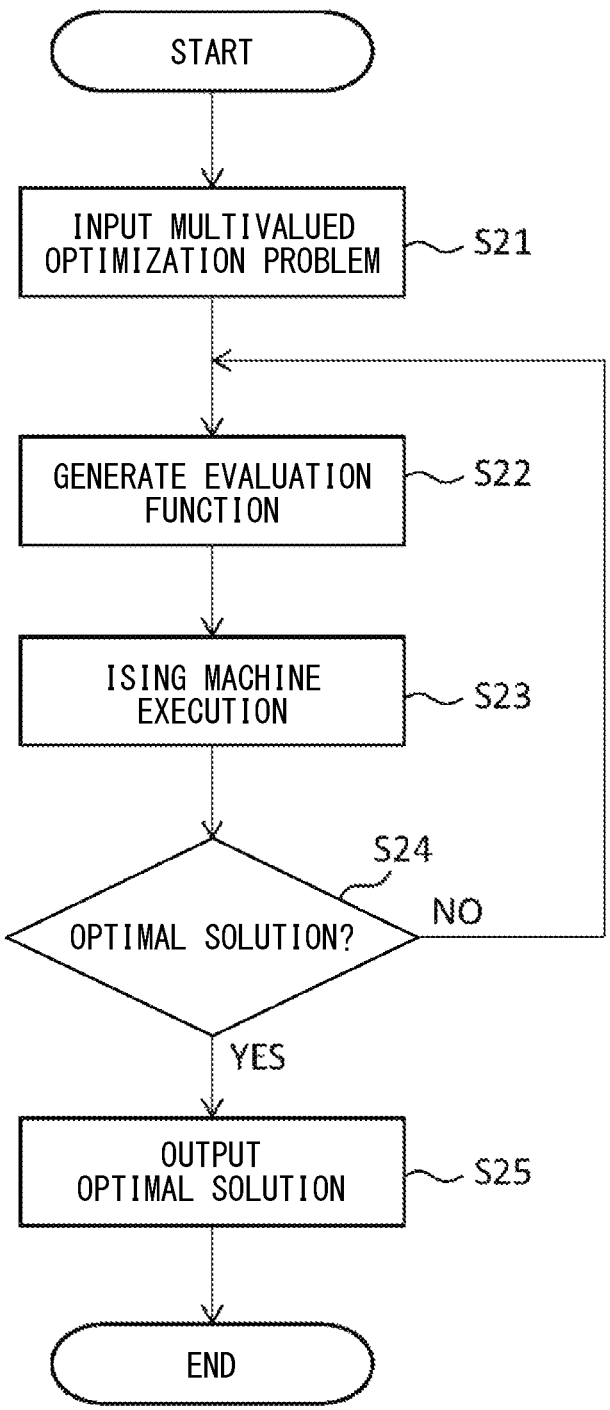
FIG. 2 is a flowchart of a combinatorial optimization method according to the first embodiment of the present disclosure.

FIG. 2 is a flowchart of a combinatorial optimization method according to the first embodiment of the present disclosure. When the input unit 11 receives a multivalued optimization problem (for example, {Jij(qq')} matrix) (step S21), the evaluation function generation unit 12 generates the evaluation function for the multivalued optimization problem (step S22). At this time, the evaluation function generation unit 12 generates the evaluation function with the binary representation using half-hot constraint as described above.

Subsequently, the Ising machine 13 uses the evaluation function generated by the evaluation function generation unit 12 to select half the states of each multivalued valuable, thereby narrowing down the candidates to half (step S23). Then, the optimization control unit 14 determines whether the multivalued optimization problem is solved, that is, whether one optimal combination of the states (optimal solution) is selected (step S24).

When it has not been optimized (step S 24: NO), the optimization control unit 14 causes the evaluation function generation unit 12 to generate again the evaluation function regarding the selected states of the variables (step S22). When one state finally remains after repeating steps S24 and S23, that is, when the optimal solution for the multivalued optimization problem is obtained (step S24: YES), the optimization control unit 14 outputs the optimal solution (step S25) to end the process. Steps S22 and S23, in which the evaluation function generation unit 12 generates the evaluation function for the multivalued optimization problem with binary representation using half-hot constraint and the Ising machine 13 executes the optimization process, correspond to a halving step of the present disclosure.

Hereinafter, a specific application of the combinatorial optimization system 10 of the present disclosure will be described. The combinatorial optimization system 10 can be used, for example, to select travel routes for multiple target vehicles so as not to cause traffic congestion.

In this example, first, the current location and the destination of each target vehicle are transmitted to the combinatorial optimization system 10 from the in-vehicle ECU of each target vehicle. Upon receiving the current location and the destination of each target vehicle, the combinatorial optimization system 10 generates Q candidate driving routes from the current location to the destination for each target vehicle. The candidate driving routes include, for example, the shortest route and at least one detour route. The matrix representation of these candidate driving routes is input to the input unit 11 as the combinatorial optimization problem.

The combinatorial optimization system 10 uses the Ising machine 13, as described above, to calculate the optimal solution for the combinatorial optimization problem that makes the evaluation function generated by the evaluation function generation unit 12 optimal. The optimal solution in this example is, for example, the combination of the driving routes of each target vehicle such that the total predicted travel time of each target vehicle is minimized.

The optimal solution calculated in this way, i.e. the information of the driving route, is transmitted from the optimization control unit 14 to the in-vehicle ECU of the corresponding target vehicle. Each target vehicle that receives the driving route will drive according to the received driving route to avoid traffic congestion and reach the destination in a short time.

As described above, according to the combinatorial optimization system 10 of the present embodiment, the Ising machine 13 halves the candidates for the optimization. Accordingly, the optimization process at each time by the Ising machine 13 becomes simple, and the overall processing cost can be reduced.

Second Embodiment

Figure 3:
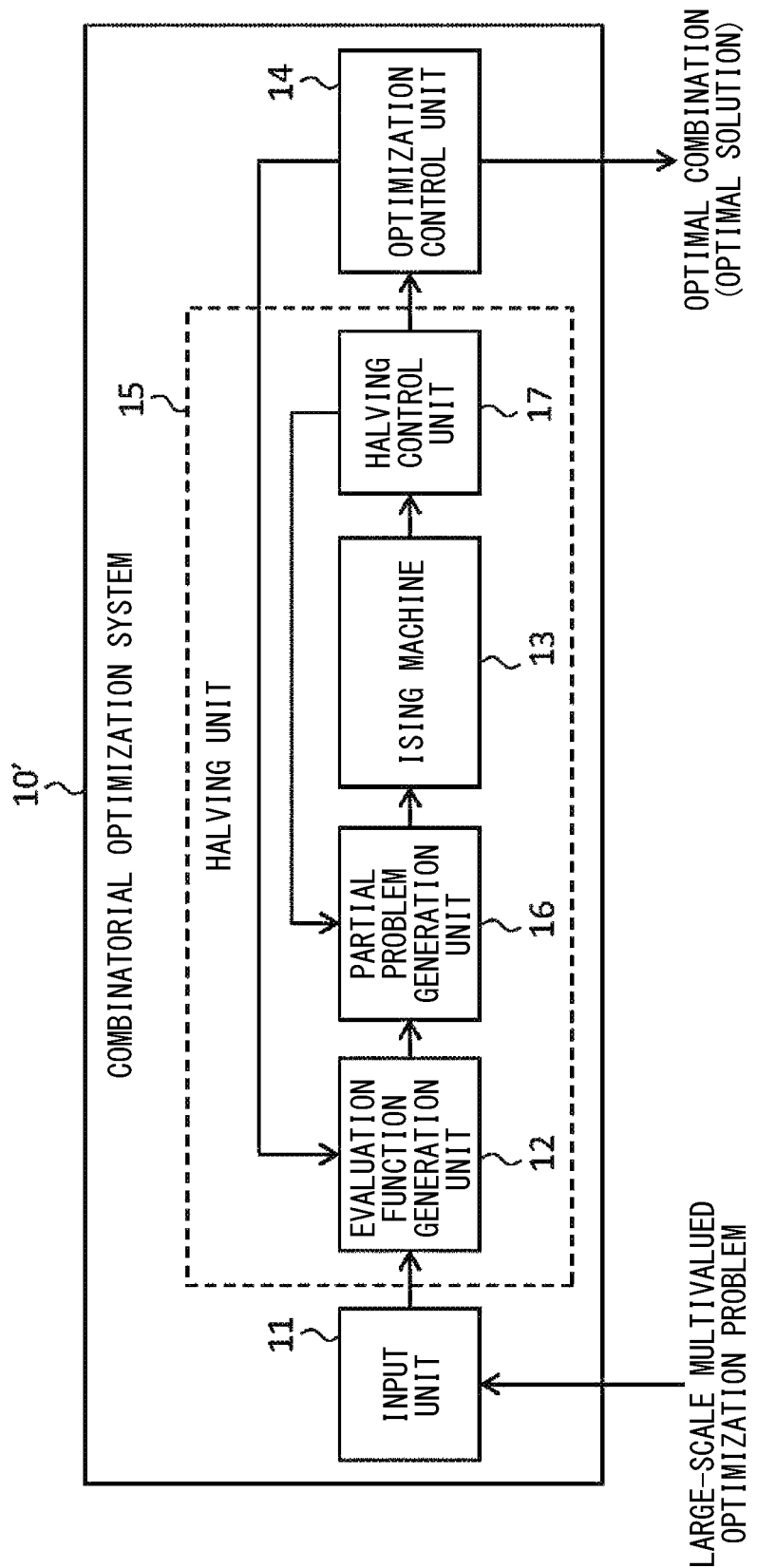
FIG. 3 is a block diagram showing a configuration of a combinatorial optimization system according to a second embodiment of the present disclosure.

FIG. 3 is a block diagram showing a configuration of a combinatorial optimization system 10' according to a second embodiment of the present disclosure. The combinatorial optimization system 10' of the present embodiment further includes a subproblem generation unit 16 and a halving control unit 17 compared with the combinatorial optimization system 10 of the first embodiment, and the halving unit 15 includes the evaluation function generation unit 12, the subproblem generation unit 16, the Ising machine 13, and the halving control unit 17. The other configurations are the same as those of the first embodiment.

When the scale of the variables of the multivalued optimization problem input to the input unit 11 is so large that the Ising machine 13 cannot optimize the evaluation function at a time or the execution by the Ising machine 13 is implemented multiple times (the multivalued optimization problem in this case is referred to as "large scale multivalued optimization problem"), the subproblem generation unit 16 generates a subproblem of the evaluation function with a binary representation. The Ising machine 13 is configured to perform a process to solve the subproblem generated by the subproblem generation unit 16.

The halving control unit 17 is configured to determine whether (i) it is needed to generate new subproblem with a binary representation by the subproblem generation unit 16 and solve the subproblem by the Ising machine 13 again (that is, repeat the generation and the optimization of the subproblem) or (ii) the halving of the evaluation function ends. The condition for the halving control unit 17 to end the halving includes, for example, (1) a certain processing time has elapsed, (2) a certain number of repetitions have been made, (3) a certain number of repetitions have been made and there is no improvement in the evaluation value, (4) an evaluation value at or above a certain level has been reached. That is, how long the process of generating the subproblem and solving the subproblem by the halving unit 15 should be carried out may be determined in advance, as in (1) and (2), or according to the results of the optimization, as in (3) and (4).

The Ising machine 13 is configured to perform a process to optimize the subproblem generated by the subproblem generation unit 16. The halving control unit 17 is configured to determine whether a solution with sufficient accuracy has been obtained by the optimization by the Ising machine 13. The halving control unit 17 is configured to output the selected half candidates to the optimization control unit 14 when the halving control unit 17 determined that a solution with sufficient accuracy has been obtained or all of the generated subproblems are optimized.

The function of the optimization control unit 14 is the same as that of the first embodiment. That is, the optimization control unit 14 is configured to return the half candidates selected by the halving unit 15 to the evaluation function generation unit 12 and cause the evaluation function generation unit 12 to generate an evaluation function again. The optimization control unit 14 is configured to repeat the above processes until one state is selected by the halving unit 15. When one optimal combination of variables (optimal solution) is obtained by the halving unit 15, the optimization control unit 14 outputs this optimal solution.

Figure 4:
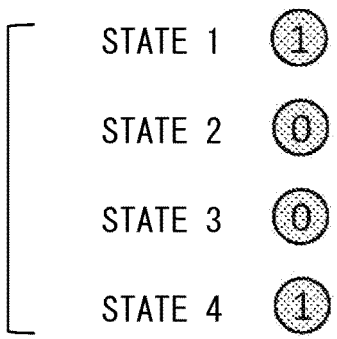
FIG. 4 is a diagram illustrating a condition where a state 1 and a state 4 are selected as tentative solution candidates in the combinatorial optimization system according to the second embodiment of the present disclosure.
Figure 5:
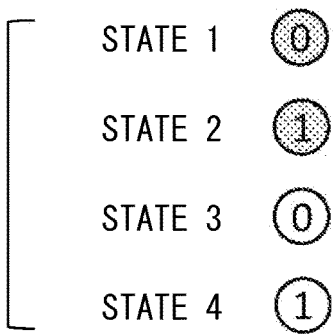
FIG. 5 is a diagram illustrating a condition where a state 2 is selected as a transition candidate from a state 1 in the combinatorial optimization system according to the second embodiment of the present disclosure.
Figure 6:
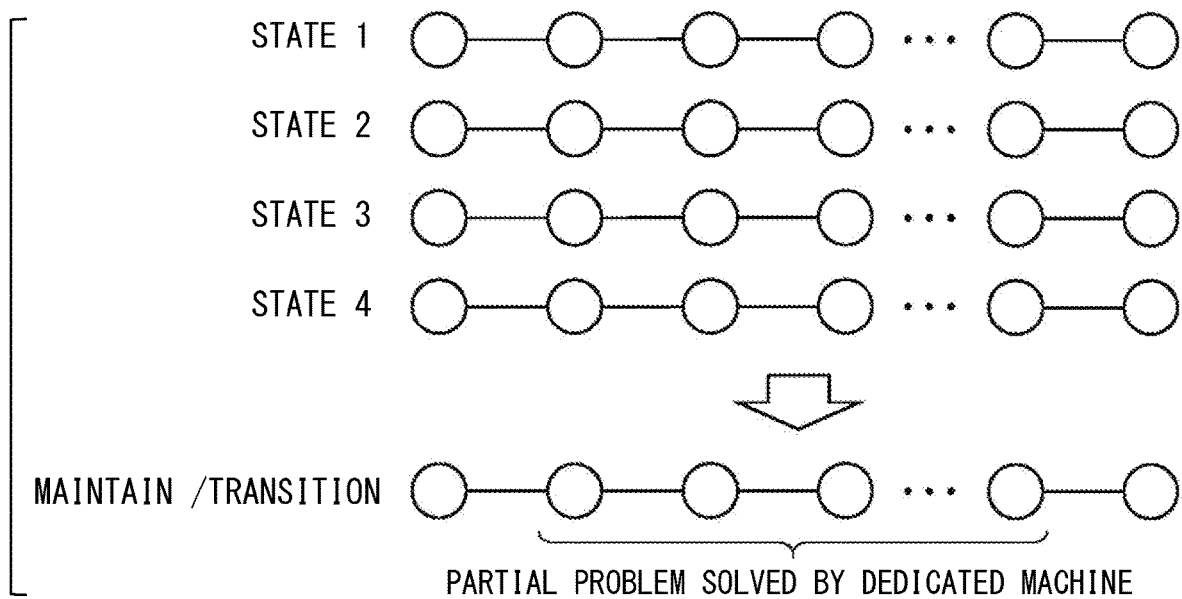
FIG. 6 is a diagram illustrating a generation of a binary subproblem fulfilling a half-hot constraint according to the second embodiment of the present disclosure.
Figure 7:
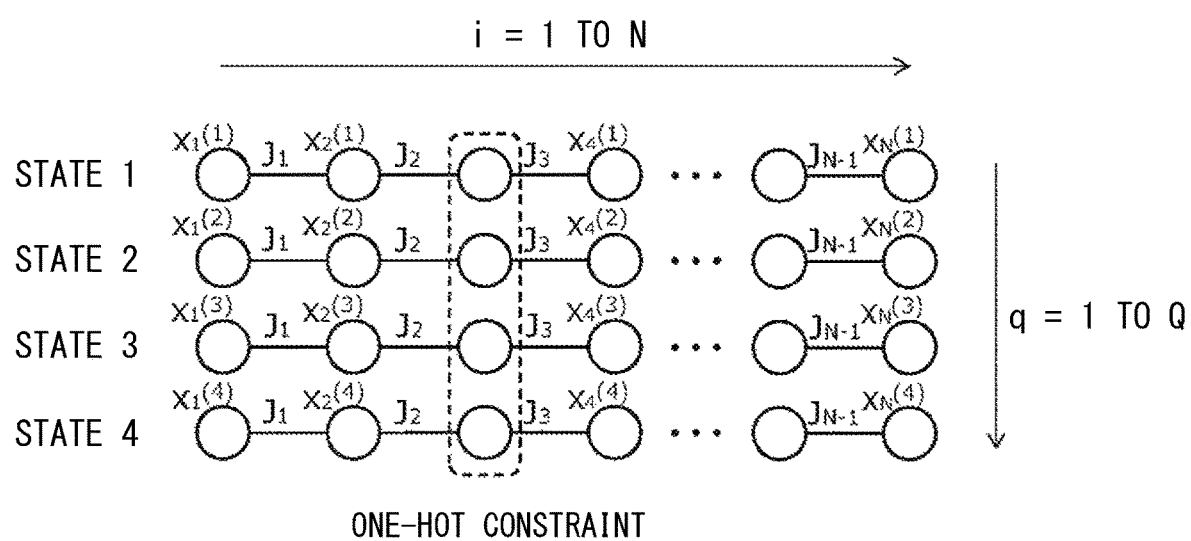
FIG. 7 is a diagram showing a binary representation of a one-dimensional Potts model using one-hot constrains.

FIGS. 4-6 are diagrams for explaining a process to solve a subproblem of the multivalued optimization problem having a large variable scale. In this example, the subproblem generation unit 16 randomly selects one state out of states currently selected (selected state) and one state out of states not currently selected (non-selected state) for each multivalued valuable, and generates a binary problem of whether the state makes the transition therebetween.

FIGS. 4-6 show an example where a multivalued problem having four states is converted into a binary problem. First, when the state 1 and the state 4 of a certain multivalued valuable are selected as tentative solution candidates as shown in FIG. 4, the subproblem generation unit 16 randomly extracts one state from the state 1 and the state 4 in addition to one state from the state 2 and the state 3 to generate a binary problem satisfying the half-hot constraint. When the state 1 and the state 2 are extracted, the state 2 is set as a transition candidate from the state 1 as shown in FIG. 5.

The subproblem generation unit 16 sets a binary variable of a maintain state where the state of FIG. 4 is maintained and a transition state where the state makes the transition to the state of FIG. 5. The subproblem generation unit 16 generates a binary subproblem fulfilling the half-hot constraint as shown in FIG. 6 by applying the same process to all the multivalued valuables. As a result, the subproblem solved by the Ising machine 13 which is the dedicated machine only contains solutions fulfilling the half-hot constraint, and accordingly the hardware resources of the dedicated machine can be effectively utilized. Further, since the parameter A for the half-hot constraint is not needed, the adjustment of the parameter A is not required. When all the variables of the binary subproblem cannot be handled by the Ising machine 13, a subproblem to be solved by the Ising machine 13 may be further generated by extracting some variables from the binary subproblem as shown in FIG. 6.

As described above, the overall processing cost can be reduced by halving the candidates to efficiently perform the optimization.

What is claimed is:

1. A combinatorial optimization system comprising:
   a processor;
   a non-transitory computer-readable storage medium; and
   a set of computer-executable instructions stored on the non-transitory computer-readable storage medium that cause the processor to:
   receive a multivalued optimization problem;
   perform halving by
      selecting half of candidate solutions of the multivalued optimization problem,
      generating an evaluation function in which the multivalued optimization problem is represented with binary representation using a half-hot constraint, and
      performing the halving by optimizing the evaluation function using an Ising machine;
   control the generating of the evaluation function such that another evaluation function is generated for halving the half of the candidate solutions; and
   obtain an optimal solution of the multivalued optimization problem by repeating the halving,
   wherein
   the optimal solution of the multivalued optimization problem is used to select travel routes for multiple target vehicles so as not to cause traffic congestion.

2. The combinatorial optimization system according to claim 1, wherein
   the multivalued optimization problem is a large-scale multivalued optimization problem for which the Ising machine performs a process multiple times for halving the candidate solutions,
   the halving includes
      generating a binary subproblem of the evaluation function fulfilling the half-hot constraint,
      optimizing the subproblem by the Ising machine, and
      determining whether to
         generate another subproblem that is optimized, or
         end the halving.

3. The combinatorial optimization system according to claim 2, wherein
   the generating of the subproblem includes
      extracting one selected state selected by the halving and one non-selected state not selected by the halving, and
      generating a binary optimization problem, as the subproblem, including
         a transition state where the extracted selected state and non-selected state make a transition therebetween, and
         a maintain state where the extracted selected state and non-selected state are maintained.

4. A method of solving a multivalued optimization problem comprising:
   inputting the multivalued optimization problem;
   halving candidate solutions of the multivalued optimization problem by
      selecting half of the candidate solutions of the multivalued optimization problem,
      generating an evaluation function in which the multivalued optimization problem is represented with binary representation using a half-hot constraint, and performing the halving by optimizing the evaluation function using an Ising machine process; and controlling the generating of the evaluation function such that another evaluation function is generated for halving the half of the candidate solutions selected for halving; and repeating the halving to obtain an optimal solution of the multivalued optimization problem, wherein the optimal solution of the multivalued optimization problem is used to select travel routes for multiple target vehicles so as not to cause traffic congestion.

5. The method of solving the multivalued optimization problem according to claim 4, wherein the multivalued optimization problem is a large-scale multivalued optimization problem for which the Ising machine performs a process multiple times for halving the candidate solutions, and the halving includes generating a binary subproblem of the evaluation function fulfilling the half-hot constraint, optimizing the subproblem by the Ising machine, and determining whether to generate another subproblem that is optimized, or end the halving.

6. The method of solving the multivalued optimization problem according to claim 5, wherein the generating of the subproblem includes extracting one selected state selected by the halving and one non-selected state not selected by the halving, and generating a binary optimization problem, as the subproblem, including a transition state where the extracted selected state and non-selected state make a transition therebetween, and a maintain state where the extracted selected state and non-selected state are maintained.

7. A combinatorial optimization system configured to solve a multivalued optimization problem and comprising at least one processor, the at least one processor configured to:

halve candidate solutions of the multivalued optimization problem by selecting half of the candidate solutions, generating an evaluation function in which the multivalued optimization problem is represented with binary representation using a half-hot constraint, and performing the halving by optimizing the evaluation function using an Ising machine process; and control the generating of the evaluation function such that another evaluation function is generated for halving the half of the candidate solutions selected for halving; and obtain an optimal solution of the multivalued optimization problem by halving the candidate solutions repeatedly, wherein the optimal solution of the multivalued optimization problem is used to select travel routes for multiple target vehicles so as not to cause traffic congestion.

8. The combinatorial optimization system according to claim 1, wherein the evaluation function comprises the following equation:

$$H_0 = -\sum_{i<j}^{N} J_{ij} \sum_{q=1}^{Q} x_i^{(q)} x_j^{(q)} + \lambda \sum_{i=1}^{N} \left( \sum_{q=1}^{Q} x_i^{(q)} - \frac{Q}{2} \right)^2,$$

and the second term of the right side of the equation corresponds to the half-hot constraint.

* * * * *